United States Patent [19]

Emmett

[11] Patent Number: 4,457,841

[45] Date of Patent: Jul. 3, 1984

[54] REGENERATION OF ION EXCHANGE MATERIALS

[75] Inventor: James R. Emmett, Brewood, England

[73] Assignee: Northern Engineering Industries plc, England

[21] Appl. No.: 290,585

[22] Filed: Aug. 6, 1981

Related U.S. Application Data

[63] Continuation of Ser. No. 135,920, Mar. 31, 1980, Pat. No. 4,298,696, which is a continuation-in-part of Ser. No. 907,029, May 17, 1978, abandoned.

[30] Foreign Application Priority Data

May 27, 1977 [GB] United Kingdom ............... 22417/77

[51] Int. Cl.³ .............................................. B03B 5/66
[52] U.S. Cl. ..................................... 209/454; 209/496; 210/662; 210/675
[58] Field of Search ............................... 209/158–161, 209/454–456, 491, 496; 210/662, 670, 675, 679, 210/686, 96.1, 189; 521/26

[56] References Cited

U.S. PATENT DOCUMENTS

2,617,766 11/1952 Emmett et al. ..................... 210/662
2,666,741 1/1954 McMullen .......................... 210/670
3,797,660 3/1974 Miller ................................. 209/160
4,120,786 10/1978 Petersen et al. .................... 209/454

Primary Examiner—Ivars C. Cintins

[57] ABSTRACT

A high degree of water purity is obtained from a mixed-bed deionization process by minimization of cross-contamination of the cation and anion materials. After service, the materials are classified into superimposed uppermost, intermediate and lowermost layers above a perforate barrier in a separator vessel. The vessel has an elongate conduit having an inlet adjacent the barrier and an outlet outside the vessel. At least a major proportion of the material of the lowermost layer is passed through the outlet of the conduit and an interface between materials is detected. Thereupon, the conduit outlet is isolated from the conduit inlet so as to segregate in the conduit material from the intermediate layer. The ion exchange materials are then regenerated and re-mixed. The segregated material is independently removed from the conduit before the next regeneration cycle starts. For example, the material may be kept in the conduit, or transferred to and kept in a separate container while the rest of the materials are being regenerated.

8 Claims, 8 Drawing Figures

REGENERATION OF ION EXCHANGE MATERIALS

CROSS-REFERENCES TO RELATED APPLICATIONS

This is a continuation of application Ser. No. 135,920, filed Mar. 31, 1980, now U.S. Pat. No. 4,298,696 which is a continuation-in-part of application Ser. No. 907,029, filed May 17, 1978, now abandoned entitled REGENERATION OF ION EXCHANGE MATERIALS.

BACKGROUND TO THE INVENTION

The invention relates to methods of, and apparatus for, regenerating ion exchange materials.

Modern high pressure boilers require a very high degree of purity in their feed water, particularly boilers of the once-through type. It is essential to ensure that corrosion products do not enter the boiler system and also to guard against ingress of soluble compounds due to condenser leaks and other faults.

Very high purity water is often required in other industries also, for example as wash water in the electronics industry for washing electronic components which have to be absolutely free from impurities during manufacture.

One of the most important water treatment processes for achieving such high purity water is the mixed bed deionisation process. The use of a mixed bed of ion exchange material means that, in effect, the water is passed through a very large number of cation and anion layers.

The regeneration of such mixed beds requires that the ion exchange materials are separated into layers. This is achieved by backwashing the mixed materials to classify them and to cause the anion material, which has the lower density, to rise to form an upper layer resting on top of the cation material.

After separation of the materials into their respective layers, the anion and cation materials can be regenerated using sodium hydroxide and sulphuric or hydrochloric acid, respectively.

It is at this stage where imperfections in the process arise. For example, at the interface between the layers, it is impossible to achieve perfect separation of the materials and consequently each layer is contaminated to some degree by material of the other layer. For the maximum degree of purity of the treated water it is important that mixing of one type of ion exchange material with another should be eliminated as far as possible.

The reason for this is that any cation material mixed with anion material is contacted, on regeneration, by the sodium hydroxide regenerant which causes the cation to be converted to the sodium form. This sodium form of the cation can subsequently give rise to sodium leakage during service flow through the mixed bed.

In the case of anion material the position is more complex. It is recognised with the types of anion materials currently available that, during their life, degradation takes place and some of the strong base groups are degraded to weak base groups. Thus, if anion material is left in the cation material, the weak base groups are converted to the sulphate form which during the subsequent treatment cycle are hydrolysed to the free base with the release of sulphuric acid. In addition strong base groups are converted to the bisulphate form and it has been found that anion resins will also absorb sulphuric acid. The rate at which bisulphate form of anion resin hydrolyses to give the sulphate form and the release of sulphuric acid and/or the rate at which absorbed acid is released appears to deteriorate with age of resin. This results in anion material increasingly retaining the acid during the standard rinsing period thus leaving more to be leached out during service flow. The absorption of acid by anion resins also applies when hydrochloric acid is used to regenerate the cation resin, thus giving the release of hydrochloric acid into the water being treated when the anion resin has aged.

The separated layers of ion exchange material can be regenerated in the vessel in which they are separated, the respective regenerants being fed into or taken from the vessel at a distributor/collector means positioned at an intermediate position of the vessel. A typical regeneration method of this type is described in UK Patent Specification No. 1318102, dated Nov. 23, 1970.

In this type of method, it will be clear that even when the interface between the layers is coincident with the distributor/collector means, because of the limitations on the definition of the interfacial region, some material from each layer will be contacted with the incorrect regenerant. In practice, it will be very difficult to ensure that the interfacial region is coincident with the distributor/collector means and consequently relatively large amounts of one or other of the layers may contact the incorrect regenerant.

The separated layers may be isolated from one another, for example by the anion layer being transferred to another vessel, prior to being regenerated. A typical regeneration method of this type is described in U.S. Pat. No. 3,414,508 to Applebaum et al, issued Dec. 3, 1968, The success of that type of method, however, depends on the accuracy of the definition of the interface; on the closeness of said region to an outlet for the anion layer; and on the degree to which any turbulence of the transfer water has caused mixing of the layers in said region during the transfer step. As cation contamination of the anion layer has been regarded as the more serious of the two situations, it has been the practice to position the outlet so that only anion material has been transferred, even at the expense of leaving anion material in the cation layer.

A further proposal for achieving separation of the layers is described in U.S. Pat. No. 4,120,786 to Peterson et al, issued Oct. 17, 1978, which describes classifying the anion and cation materials into two distinct layers. Once classification has been achieved, the upward flow of classifying water is maintained while cation material is drained from the base of the vessel in which classification has occurred. The continued upward flow of water together with the shape of the conical fluid distributor is alleged to result in perfect separation of the materials. Once the cation material has left the vessel, a valve is closed to retain the anion material in the vessel and it is alleged that no cross-contamination of materials occurs.

In the applicant's experience, however, even with very careful hydraulic classification of the materials continued for the maximum practicable time cross-contamination of the materials is unavoidable. In the method disclosed in U.S. Pat. No. 4,120,786 some water must flow out of the vessel with the cation material and it is believed that the interface between the two layers must be disturbed by such flow and that cross-contamination of the materials is thereby increased.

That method necessarily imposes very critical limits on the design and positioning of the valve and the pH monitor, which is used to detect the interface.

A further known practice has been to raise the pH of boiler feed water to e.g. 9.4–9.6 using ammonia, which reduces corrosion in the boiler. Ammonia is preferred because it passes through the vapour cycle and re-dissolves in the condensate. To stop the cation material stripping ammonia from the boiler water, the cation material is ammoniated after being regenerated. This ammoniation step can also be applied to the regenerated anion layer to convert the sodium form of the contaminant cation material to the required ammoniated form as described in U.S. Pat. No. 3,385,887, issued May 28, 1968.

This practice, however, only provides a solution to the problem and does not prevent it; nor is it a solution when ammoniation of the treated water is not required and may even be undesirable.

Alternatively, as that process uses a considerable quantity of ammonia it is usual to operate initially with the hydrogen form of the cation material thus allowing the cation material to strip ammonia from the condensate. The process requires ammonia to be re-introduced downstream of the ion-exchange units to maintain the required pH level.

However, when all the hydrogen sites on the cation material are exhausted by ammonia, the ammonia then displaces any sodium thereon from the cation material and leads to sodium leakage into the boiler water.

Clearly, the amount of leakage is dependent on the amount of sodium remaining on the cation material after regeneration which, in turn, depends on the separation achieved during classification and transfer or regeneration and the efficiency of regeneration.

In a similar manner, chloride leakage may occur due to the displacement of chloride ions from the anion material by hydroxide ions. This again depends on the separation achieved during classification and transfer or regeneration and the efficiency of the regenerant.

BRIEF SUMMARY OF THE INVENTION

It is an object of the present invention to reduce or obviate one or more of the above mentioned disadvantages.

The present invention adopts a practicable degree of hydroclassification of the materials without attempting total elimination of cross-contamination during classification or during the transfer of materials for regeneration. The materials are classified into three superimposed layers comprising an intermediate layer separating uppermost and lowermost layers. The three layers are then dealt with in such a way that the inevitable cross-contamination of the materials has little or no deleterious effect during regeneration or service use of the materials.

According to one aspect of the invention, a method of performing repeated cycles of regeneration of anion and cation ion exchange materials is provided, which method comprises in each cycle passing a mixture of the materials into a separator vessel containing a perforate barrier beneath the materials and having an elongate conduit having an inlet adjacent the barrier and an outlet outside the vessel, classifying the materials into uppermost, intermediate and lowermost layers, passing material into said conduit, detecting an interface between materials of two of said layers, isolating the outlet from the inlet in response to detection of said interface after a first volume being at least a major proportion of material of the lowermost layer has passed through said outlet so as to segregate in said conduit a second volume being material from the intermediate layer, regenerating the ion exchange materials and re-mixing the regenerated materials, said second volume being removed from said conduit independently of said first volume before commencement of the next regeneration cycle.

According to another aspect of the invention, a method of performing repeated cycles of regeneration of anion and cation ion exchange materials, which method comprises in each cycle passing a mixture of the materials into a separator vessel containing a perforate barrier beneath the materials and having an elongate conduit having an inlet adjacent the barrier and an outlet outside the vessel, classifying the materials into superimposed uppermost, intermediate and lowermost layers, passing material into said conduit, detecting an interface between materials of two of said layers in the conduit, isolating the outlet from the inlet in response to detection of said interface after a first volume being at least a major proportion of material of the lowermost layers has passed through said outlet so as to segregate in said conduit a second volume being material from the intermediate layer, regenerating the ion exchange materials and re-mixing the regenerated materials, said second volume being removed from said conduit independently of said first volume before commencement of the next regeneration cycle.

When only cation and anion materials are present, the intermediate layer comprises mixed cation and anion materials, the lowermost and uppermost layers being relatively uncontaminated cation material and relatively uncontaminated anion material, respectively.

However, it is preferred to add inert particulate material which has a density intermediate the densities of the cation and anion materials so that the cross-contamination of the one material by the other in the intermediate layer is reduced. The inert material has a separating and diluting effect on the cross-contamination of the cation and anion materials but the amount which it is practicable to add depends on the actual capacities of the vessels and on other technical factors.

Preferably, however, the amount of inert material used is such that, on separation, a layer of substantially pure inert material is formed between the cation material and anion material layers, so that said layer of substantial pure inert material comprises the intermediate layer. The substantially pure inert material does contain anion and cation particles, but in such small quantities that it is impracticable to remove them, even if that is possible, by continued classification of the materials. Once such a layer of inert material has been formed, then the addition of further quantities of the inert material makes little, if any, difference to the number of anion and cation particles present in the layer.

The isolation of the outlet from the inlet of the conduit occurs in response to the detection of an interface between materials of two of the layers. That detection preferably occurs in the conduit, but alternatively can occur in the vessel. When an interface is detected in the vessel, it will be a substantially horizontal interface between materials of two of the layers. When an interface is detected in the conduit, the interface that was formed between the materials in the vessel is now in the conduit but is unlikely to be still horizontal or even normal to the direction of flow of the materials through the conduit. However, the interface is still such that it is detectable.

When inert material is absent or is present in a volume insufficient to give optimum separation of the cation and anion materials said interface lies between substantially uncontaminated cation and anion materials and is virtually co-extensive with the material of the intermediate layer.

When inert material is present in an amount sufficient to ensure that the intermediate layer comprises a layer of substantially pure inert material, a first interface is formed between substantially uncontaminated cation material of the lowermost layer and the material of the intermediate layer and a second interface is formed between the material of the intermediate layer and substantially uncontaminated anion material of the uppermost layer. Either of the first and second interfaces can be the interface that is detected.

Preferably, the cation material has a particle size of not less than substantially 0.5 millimeters (mm) diameter, the anion material has a particle size of not greater than substantially 1.2 mm and the inert material has a particle size substantially in the range of 0.5 mm to 0.9 mm diameter.

Within the scope of the basic method are a number of alternative steps that can be taken as will be apparent from the more detailed description given below with reference to the accompanying drawings.

The invention also provides apparatus for performing repeated cycles of regeneration of anion and cation ion exchange materials comprising at least first and second vessels each containing a respective perforate barrier to retain ion exchange material thereon, said first vessel having supply means by which a classifying flow of liquid can be established to classify materials therein into three superimposed layers comprising an intermediate layer separating uppermost and lowermost layers, said supply means also comprising transfer flow supply means for effecting hydraulic transfer of materials from the first vessel, an elongate conduit having at a first end an inlet adjacent said perforate barrier of said first vessel and having at a second end an outlet in said second vessel above said perforate barrier thereof, a valve in the conduit and a detector means, said valve being closable to isolate the outlet from the inlet in response to detection of an interface between materials of two of said layers by said detector means.

BRIEF DESCRIPTION OF THE DRAWINGS

Methods and apparatus will now be described by way of example to illustrate the invention with reference to the accompanying drawings, in which.

Figure 1:
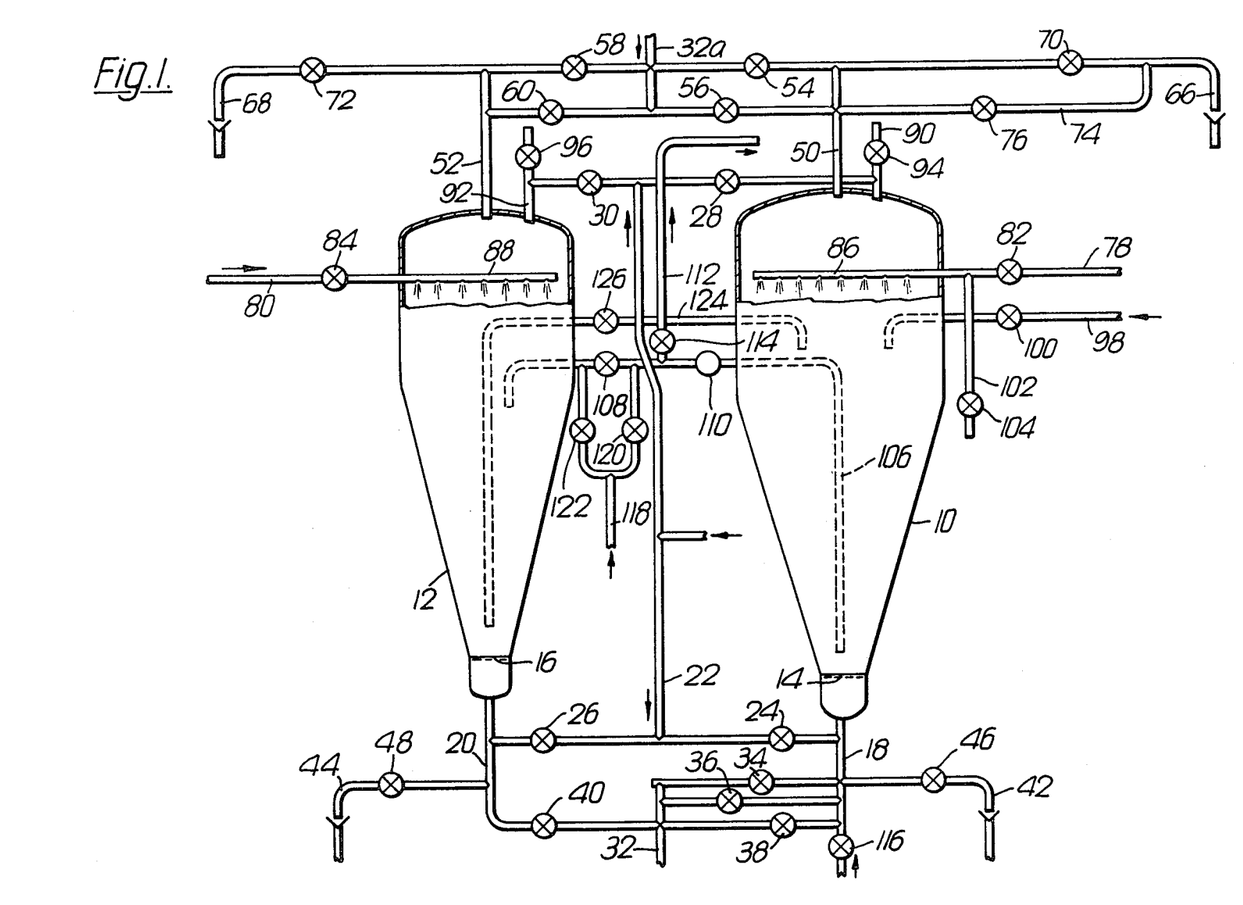
FIG. 1 is a schematic diagram of one form of apparatus.

FIG. 1 shows a regeneration station comprising a separator vessel 10 and a cation regenerator vessel 12. The vessels 10 and 12 have inverted frusto-conically shaped bases. The included angles, as seen in diametral cross-section, of the bases of the vessels 10 and 12 are 30°. The vessels 10 and 12 have respective perforate barriers 14 and 16 in their bases, which barriers 14 and 16 permitting the passage of liquid while retaining ion exchange resins thereon.

The vessels 10 and 12 have respective lower inlet/outlet pipelines 18 and 20 connected to internal distributors located below the perforate barriers.

The pipelines 18 and 20 are connected to:

(a) an air supply pipeline 22 via valves 24 and 26, respectively;

(b) a water supply pipeline 32 via flow control valves 34, 36 and 38 and 40, respectively; and (c) respective drain pipeline 42 and 44 via valves 46 and 48, respectively.

The air supply pipeline 22 is connected to other pipelines via valves 28 and 30 as described below.

The vessels 10 and 12 have respective upper inlet/outlet pipelines 50 and 52.

The pipelines 50 and 52 are connected to:

(a) a further water inlet pipeline 32a via flow control valves 54, 56 and 58, 60, respectively; and (b) respective drain pipelines 66 and 68 via valves 70 and 72, respectively.

The pipeline 50 also has a pipeline 74 connecting it to the drain pipeline 66 via a flow control valve 76.

The vessels 10 and 12 have respective regenerant inlet pipelines 78 and 80 controlled by valves 82 and 84, respectively, in the vessels 10 and 12.

The vessels 10 and 12 have upper pipelines 90 and 92, respectively, controlled by respective air vent valves 94 and 96, repectively. The pipelines 90 and 92 are also connected to air supply pipeline 22 by the valves 28 and 30, respectively.

The vessel 10 has an inlet 98 controlled by valve 100 and through which resins from a service unit can be introduced into the vessel 10.

The vessel 10 has a further drain pipeline 102 controlled by valve 104, the pipeline 102 being connected to the pipeline 78.

The vessel 10 also has a transfer conduit 106 connecting it to the vessel 12 and which has a valve 108. The inlet to the transfer conduit 106 is adjacent the screen 14 and is centrally located of the vessel 10. As a guide it is proposed to space the inlet of the transfer conduit 106 from the screen 14 of the vessel 10 by an amount approximately equal to half the radius of the transfer conduit 106.

A detecting means, for example, a conductivity-responsive instrument 110, is located in the transfer conduit 106 to enable an interface between materials to be detected therein. The instrument responds to the change in the apparent composite conductivity of the transferring liquid and of the materials being transferred as the interface passes the instrument.

A pipeline 112 controlled by a valve 114 leads from the transfer conduit 106 back to the service unit. Water for effecting this transfer can be introduced into pipeline 18 via valve 116 which allows a high flow rate into the vessel 10.

A water supply pipeline 118 is connected to the transfer conduit 106 on either side of valve 108 via valves 120 and 122 to enable flushing water to be supplied to the transfer conduit 106 on either side of the valve 108.

The vessel 12 is connected to the vessel 10 by a second transfer conduit 124 controlled by a valve 126.

The flow control valves each permit a flow determined by the step being performed.

The service unit contains, for example, Duolite A16-1CI (Trade Name), an anion ion exchange resin having a particle size of not greater than 0.9 mm diameter; Duolite-C26TR (Trade Name), a cation ion exchange resin having a particle size of not less than 0.7 mm diameter; and a polystyrene co-polymer particulate material, an inert resin having a particle size in the range 0.65 mm to 0.85 mm diameter and a density intermediate the densities of the anion and cation resins. These resins are available from Dia-Prosim U.K. Limited. Alternative materials are available from Rohm and Hass (U.K.) Ltd. under the trade names Amberlite 900A (anion), Amberlite 200A (cation) and Ambersep 359 (inert).

In this embodiment sufficient inert resin is present in the admixture such that, upon classification, an intermediate layer is formed of substantially pure inert resin.

When the resins in the service unit require regeneration, they are transferred to the vessel 10 via pipeline 98, valve 94 being open to vent air from the vessel 10.

Valve 24 is opened to introduce air and valve 36 is substantially opened to introduce backwash water which goes to drain pipeline 66 via valve 70. This is a preliminary removal of dirt from the resins so that a better separation of the resins can be achieved.

Valves 24 and 94 are then closed and an increased flow of water into vessel 10 is made by opening valve 34 to add to the flow through the pipeline 18 via valve 36. The water again leaves the vessel 10 to drain pipeline 66 via valve 70.

This controlled flow of water through vessel 10 classifies the resins into an uppermost layer of anion resin, an intermediate layer of substantially pure inert resin and a lowermost layer of cation resin.

The flow of water is then decreased by closing valve 34 to allow the classified resins to settle to an extent, the valve 36 still being open.

When classification is complete, valve 70 is closed and valves 76 and 96 are opened. The flow of water through valve 76 establishes a slight upward flow of water in the vessel 10. Valve 108 is then opened. The surplus of water entering the vessel 10 through valve 36 over that leaving the vessel 10 through valve 76 causes hydraulic transfer of a first volume of material, being at least a major proportion of the cation resin, through transfer conduit 106 to the vessel 12. The transfer rate has to be kept relatively slow in order to maintain the intermediate layer in the vessel 10 between the uppermost and lowermost resin layers, i.e. the substantially pure inert resin layer, substantially horizontal. Too fast a transfer rate causes the intermediate layer to fall in the centre of the vessel. The use of a vessel with a cone-shaped base reduces the area at the take-off point for the cation resin.

While the intermediate layer can be kept reasonably horizontal without it, the upward flow of water through valve 76 assists in maintaining the intermediate layer substantially horizontal. It is believed that this happens because the upward flow maintains the resins in a slightly fluidised state, thus causing a continuous classification of the resins to occur during the transfer step which results in the intermediate layer remaining substantially as formed as it moves down the vessel 10. Without this positive upward flow, an upward flow does still occur to some extent since resin is being conveyed down and out of the vessel 10 and some of the incoming water has to flow upwardly to occupy the volume previously occupied by the transferred resin and this flow can be sufficient to meet the requirements of the system.

As the transfer proceeds, the conductivity instrument 110 detects the cation-inert interface. A timer "T" (indicated in FIG. 4 but ommitted from FIG. 1) is then started up and when a suitable timed delay has elapsed the valve 108 is closed in response to the detection of the interface. The timed delay is chosen in accordance with the relative positioning of the instrument 110, and valve 108 and the outlet of the conduit, and the transfer rate to ensure that substantially all of the first volume, i.e. the cation material, and preferably a small amount of the inert material from the intermediate layer, have left the outlet of the conduit. Valves 36 and 76 are closed at the same time as the valve 108.

This termination of the transfer flow thus isolates a second volume, being at least the major proportion of the material from the intermediate layer in the transfer conduit 106 which has an internal volume such as to substantially accommodate and isolate that second volume. A relatively small amount of the inert material from the intermediate layer may also remain in the vessel 10.

The cation resin, now substantially wholly in the vessel 12, is then given an air scour by opening valve 26 and this is terminated after the necessary length of time by closing valves 26 and 96.

The cation resin is then backwashed by opening valves 40 and 72 which are closed after the necessary length of time to complete the backwash.

The anion resin, in vessel 10, is subjected to a partial draindown by opening valves 28 and 104 after which they are closed.

The anion resin is then subjected to an air scour and a backwash, similar to the cation resin, by opening and closing valves 24 and 94 and then opening and closing valves 38 and 70.

This cleaning stage of the resins is the main cleaning step and more vigorous than the earlier one as there are less amounts of resin in the vessel and a greater force can be used without resin being lost to drain.

Sodium hydroxide regenerant is introduced into the vessel 10 through pipeline 78 and leaves the vessel 10 to drain 42 via valve 46 and sulphuric acid regenerant is introduced into vessel 12 through pipeline 80 and leaves the vessel 12 to drain pipeline 44 by valve 48. To counteract the dilution effect of the water filling the reminder of vessel 10 above the anion resin, relatively stronger solutions of sodium hydroxide may be used so that they dilute to the required strength in the vessel 10.

After regeneration is complete, valves 82 and 84 are shut and valves 56 and 60 are opened to introduce rinse water to the vessels 10 and 12, respectively.

During the rinsing of the cation resin, the transfer conduit 106, on the vessel 12 side of the valve 108 is subjected to a flushing flow of water by opening and then closing valve 122.

Once the resins are properly rinsed, valves 48, 56 and 60 are shut.

The anion resin is then partially drained down using air pressure via valve 28. Valves 28 and 46 are then closed.

Valves 40, 58, 70 and 126 are opened to hydraulically transfer the regenerated cation resins from the vessel 12 back to the vessel 10. Upon completion of the transfer, valves 40, 58, 70 and 126 are closed. The vessel 10 is then partially drained down by opening and then closing of valves 28 and 104. The resins are then air mixed by the opening, and then closing, of valves 24 and 94.

The mixed resins are then hydraulically transferred back to either a storage vessel where it can be held until required or direct to the service unit. The transfer is achieved by opening valves 36, 38 and 54 to give a combined flow of water into transfer conduit 106 and by opening valves-114. After the transfer is completed, these four valves are then shut. Valve 120 can then be operated to flush transfer conduit 106 back into vessel 10 to ensure any resin remaining in the transfer conduit 106 between valve 108 and pipeline 112 is flushed back into vessel 10 prior to a subsequent regeneration cycle.

If the regenerated resins are returned to the service unit by a pipeline other than transfer conduit 106, the transfer conduit 106 would still have to be flushed to transfer the remaining portion of the intermediate layer into the vessel 10 prior to a subsequent regeneration cycle.

While it is feasible to use parallel-sided vessels, the cone-shaped base type of vessel shown in the drawing is preferred. In the case of vessel 10, such a base assists in the transfer of the cation resin therefrom by restricting the take-off area and in the case of vessel 12 reduces the amount of water needed to transfer the cation resin to the vessel 10 again because of the restriction on the take-off area. The preferred included angle of 30° for the base of at least the vessel 10 is chosen because it has been found that, at included angles of greater than 30°, the intermediate layer became less distinct and that at included angles of less than 30°, the height of the vessel 10 becomes too great.

The barriers 14 and 16 may be wire screens or each may be a screen formed by casting sand coated with and bonded by an epoxy resin. It has been found that the wire screen can retain some resin on it. It is thought that this arises when the direction of movement of the resin beads towards the transfer conduit 106 is transverse to the slots in the screen. This results in typically 20 to 30 milliliters per 100 liters of cation resin remaining in the vessel 10 to contaminate the anion resin. If this level of contamination can be tolerated then the wire screen is adequate. If it cannot be tolerated, then the bonded-sand screen should be used. The bonded-sand screen also has the advantage that it can be cast to have an inverse conical upper surface having an included angle, as seen in diametral cross-section, of, for example, 160°, the central portion having a flat plate positioned to lie underneath the inlet to the conduit 106. Thus, use of the bonded-sand screen minimises the amount of cation contamination of the anion resin that can arise as a result of the screen.

The invention will now be further described in the following example.

EXAMPLE I

A test apparatus was constructed in which the vessel 10 had an upper parallel-sided portion measuring 1000 millimeters (mm) in height and 610 mm in diameter and a lower conical portion having a height of 618 mm, a lower diameter of 390 mm and an included angle of 30°. The transfer conduit 106 had a nominal inside diameter of 20 mm and, therefore, a spacing from the screen 14 of 5 mm.

The vessel 12 was a parallel-sided vessel having a height of 1300 mm and a diameter of 610 mm.

Table I gives typical operation conditions used on the test rig.

TABLE I

| Stage | m³/h | m/h | minutes |
|---|---|---|---|
| Backwash: | | | |
| Initial flow rate | 2.25 | | |
| Velocity in: | | | |
| parallel-sided portion | | 8 | |
| cone base | | 19 | |
| Time | | | 30 |
| Final flow rate | 1.0 | | |
| Velocity in: | | | |
| parallel-sided portion | | 4.0 | |
| cone base | | 9.0 | |
| Time | | | 5 |
| Resin transfer: | | | |
| Inlet flow rate (valve 36) | 1.0 | | |
| Velocity at base of cone | | 9.0 | |
| Upward bleed flow | 0.33 | | |
| Bleed velocity in: | | | |
| parallel-sided portion | | 1.1 | |
| cone base | | 2.74 | |
| Resin transfer & conveying water | 0.78 | | |
| Time | | | 13 |

Tests in which the amount of cation resin present in the anion resin were determined were carried out by classifying the resins in vessel 10, transferring all of the resins to vessel 12 and sampling the resins in the transfer conduit 106. The results are given in Table II. The volume of inert resin given are sufficient in the test apparatus to form an intermediate layer of substantially pure inert resin.

TABLE II

| Test No. | Cation % H | Anion % OH | Volume of inert resin-litres | % cation in anion (Vol./Vol.) |
|---|---|---|---|---|
| 1. | 78 | Nil | 25 | 0.28 |
| 2. | 78 | Nil | 30 | 0.27 |
| 3. | 78 | Nil | 30 | 0.15 |
| 4. | 56 | 4 | 30 | 0.075 |
| 5. | 56 | 4 | 30 | <0.1 |

These tests show that the degree of cation contamination is at a very low level. For example, with a conventional ion exchange method, the percentage of cation in anion resin would typically be 5%.

The decrease in hydrogen ion concentration of the cation resin increases the density of the resin and appears to have an appreciable effect on the level of the contamination. In service the hydrogen ion concentration of the cation resin would be typically in the region 10% to 30% when the resin is ready for regeneration.

On a typical full size plant, the vessel 10 has an upper parallel-sided portion measuring 2768 mm in height and 1800 mm in diameter and a lower conical portion having a height of 2426 mm, a lower diameter of 600 mm and an included angle of 30°. The transfer conduit 106 has a nominal inside diameter of 75 mm and an internal volume sufficient to accommodate substantially the material from the intermediate layer. Typically, the volumes of cation and anion resins to be separated in this vessel are 4.5 m³ (cubic meters) and 2.25 m³, respectively, there being at least 0.1 m³ of inert resin admixed therewith to give an intermediate layer on classification of some 0.022 m³ of substantially pure inert material.

Conductivity cells which are available from Electronic Instruments Ltd. U.K. are suitable for detecting the change in conductivity at an interface between materials.

Figure 2:
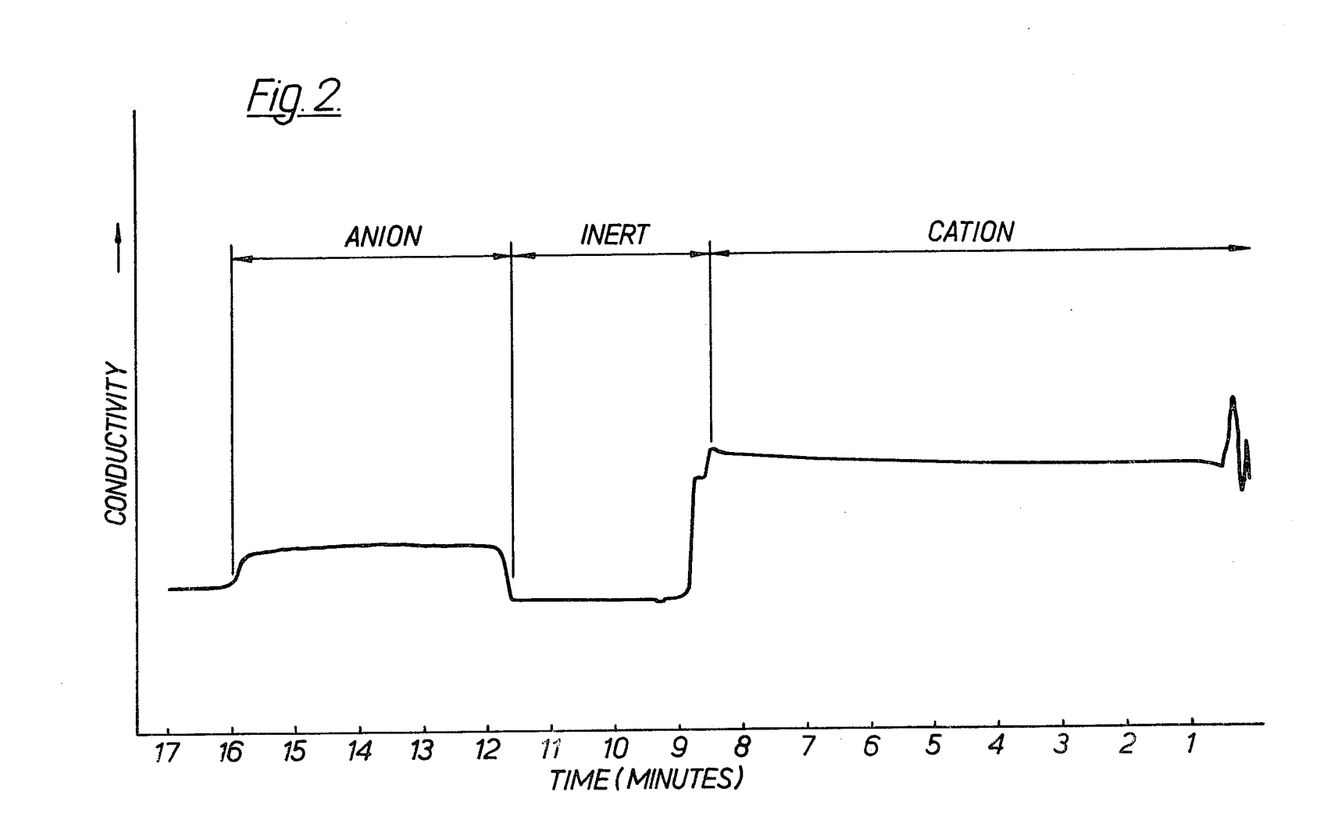
FIG. 2 is a chart recording of conductivity measured during a test transfer in which all the materials were transferred between two vessels through an elongate conduit.

FIG. 2 is a chart which shows the changes in response of such an instrument corresponding to the changes in apparent conductivity assuming a complete transfer of all of the classified resins from vessel 10 to vessel 12.

Of course, in carrying out transfer during actual operation of the method and apparatus, transfer is terminated in response to detection of a change in conductivity. The change in conductivity at the interface between the cation material and the inert resin material from the intermediate layer is the most pronounced, as clearly shown by the test trace given in FIG. 2. However, a fairly pronounced change also occurs at the interface between the inert material of the intermediate layer and the anion material. Valve operation may occur if preferred in response to that change.

FIG. 2 also clearly shows that the anion and cation material can be widely separated as the result of passing the material from the interfacial region into the relatively long transfer conduit 106, which has an internal diameter which is several times less than the smallest diameter of the lower region of the inverted frusto-conical part of the vessel 10. In other words, the separation achieved in the vessel 10 is enhanced by the effect of the transfer conduit 106 and the trace shown in FIG. 2 emphasises that differentiation between the materials is optimised by that increased separation. Thus, the presence of the critical intermediate layer can be very accurately detected so that an extremely efficient transfer of cation material into the vessel 12 can be readily achieved. The contamination of the cation material is extremely negligible.

Furthermore, the segregation of the second volume of material in the conduit 106, i.e. at least a major proportion of the material from the intermediate layer, means that the positioning of the detector means 110 along the transfer conduit 106 is not critical; nor need the valve 108 be positioned immediately adjacent the detector means 110.

The valve 108 is required only to stop flow.

The valve 108 is not required to close, in every cycle of regeneration, at precisely the instant when a particular interface coincides with the valve.

On the contrary, the invention requires merely that the second volume is segregated in the transfer conduit. That requirement is readily met on every cycle. At the same time complete transfer of cation material is reliably ensured without any contamination beyond, at most, a negligible amount.

FIG. 2 also shows that if inert material is not used, or only a relatively small amount of inert is used, there would still be an appreciable conductivity change ample to indicate that the second volume was in the transfer conduit 106 and that the first volume, i.e. the material from the lowermost cation layer, had passed through the transfer conduit 106.

The contaminated materials of the intermediate layer, in this instance are preferably substantially all isolated in the transfer conduit 106 so that relatively only very pure cation and anion materials are regenerated. To ensure that substantially all of the material of the intermediate layer is segregated, the apparatus can be arranged such that on termination of the transfer flow some relatively uncontaminated cation material remains in the transfer conduit and some relatively uncontaminated anion material has entered the transfer conduit 106.

When the service units are being operated only on the hydrogen cycle, then the contaminated materials from the intermediate layer segregated in the transfer conduit 106 can be returned to the service unit without any appreciable detriment to the quality of the treated water since they have not been contacted with regenerants.

However, it is preferred, and when operation through into the ammonia cycle is required it is essential because of the detrimental effects of sodium breakthrough, to not allow such materials to be returned to the service unit. In this instance, the contaminated materials from the intermediate layer are removed from the transfer conduit 106 before the next regeneration cycle and are preferably returned to the vessel 10 where they would remain until joined by the exhausted mixed resins next transferred from a service unit.

Thus the invention provides for complete isolation of the second volume of mixed contaminated resins, which unavoidably form the intermediate layer.

FIGS. 3A to 3D will now be described.

Figures 3A, 3B, 3C, 3D:
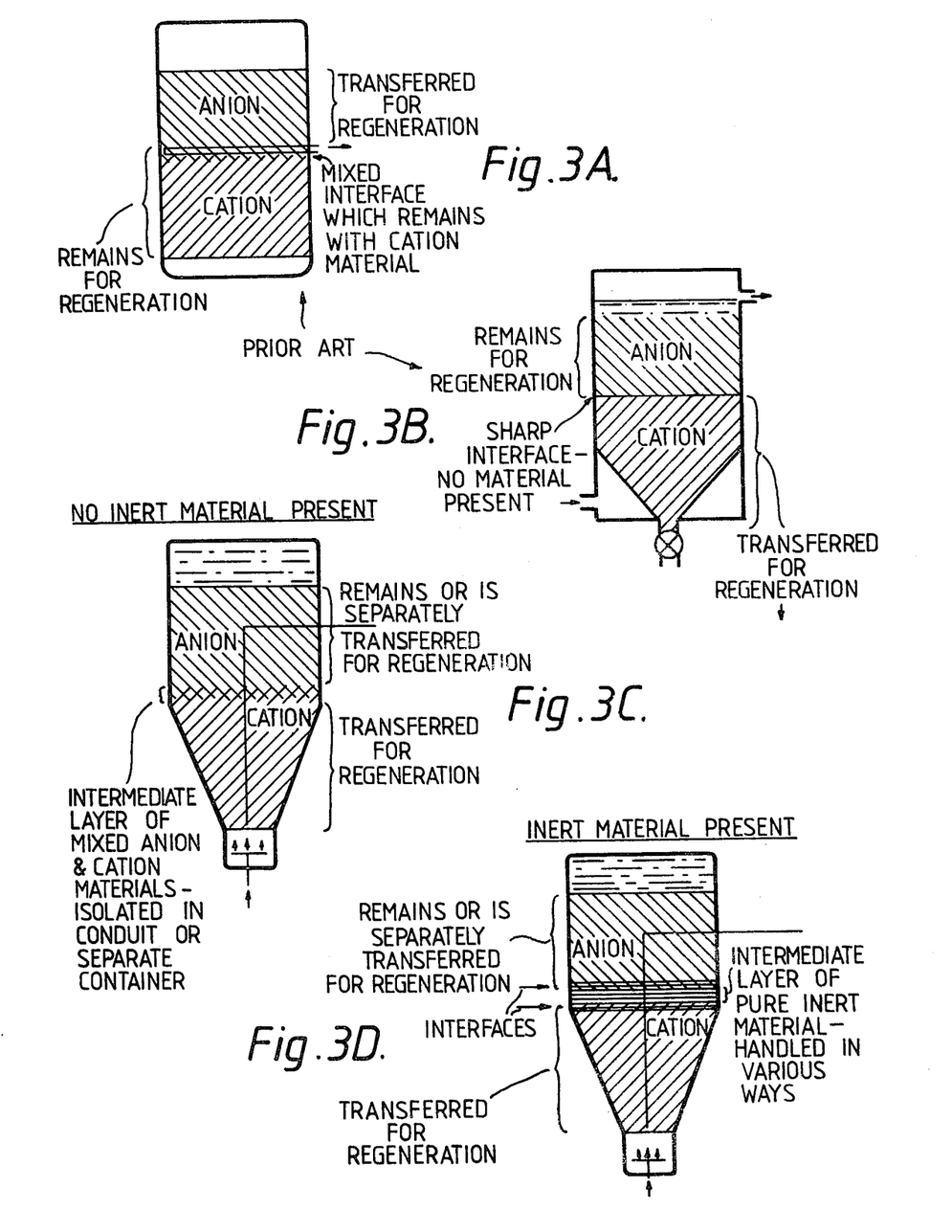
FIGS. 3A to 3D depict some methods of handling resins, FIGS. 3A and 3B showing prior art methods and FIGS. 3C and 3D showing methods according to the invention.

FIGS. 3A and 3B depict prior art methods. In the method depicted in FIG. 3A, the anion material is transferred from the vessel and the mixed anion and cation materials at the interface between cation and anion materials are left in the vessel to be contacted by the acid regenerant. In the method depicted in FIGS. 3B, the cation material is drained from the vessel. Continuous classification during removal of the cation material from the vessel allegedly results in a sharp interface and, consequently, no cross-contamination of the anion and cation materials.

FIGS. 3C and 3D depict the methods of the present invention as herein described. It will be appeciated from a comparison of FIGS. 3A and 3B with FIGS. 3C and 3D that the present invention is novel and inventive over that prior art. The prior art either only partially deals with the cross-contaminated materials (FIG. 3A) or alleges a method that achieves perfect separation (FIG. 3B). On the other hand, the present invention recognises, that perfect separation is not practicable and having recognised that fact proposes a solution which ensures that the problems arising from the unavoidable cross-contamination of the materials are minimised.

Modifications are possible as follows:

For example, once the second volume has been segregated in the transfer conduit 106, the anion material from the uppermost layer may be transferred to a third vessel for regeneration.

Figure 4:
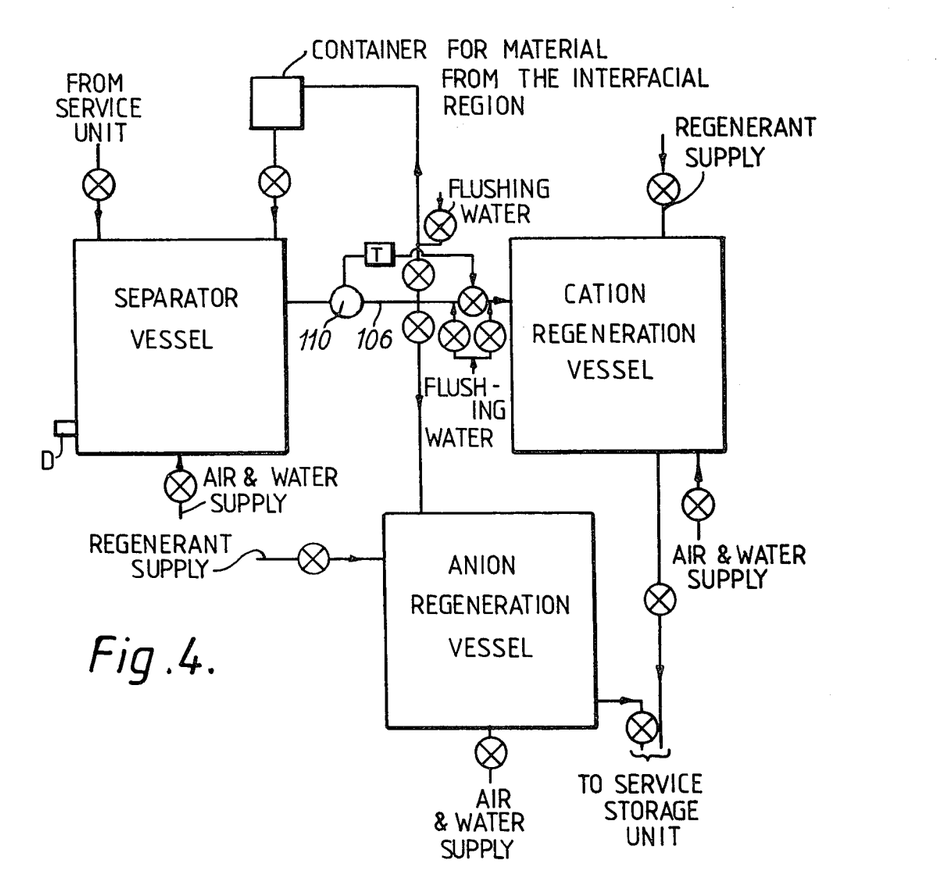
FIG. 4 is a simplified sketch of apparatus similar to that shown in FIG. 1 but illustrating some modifications.

Following regeneration, the materials may be transferred to a third (or fourth as the case may be) vessel for re-mixing (see FIG. 4). Alternatively, they can be transferred direct to a service unit if facilities are available for promoting mixing therein (see FIG. 4).

While FIG. 4 shows valves in individual lines, where appropriate a multi-flow valve may replace two or more on/off valves, if required.

Instead of segregating the second volume of material in the transfer conduit 106, particularly when inert material is not used to form the intermediate layer, the second volume can be removed from the transfer conduit 106 and, for example, be held in a separate hold vessel (see FIG. 4) during regeneration and returned to the vessel 10 after the resins therein had been returned to storage or service. This can be achieved by continuing the flow of transfer water after the valve 108 is shut to transfer the second volume out of the transfer conduit 106.

In this instance, to ensure that the resins returned to service are all regenerated, the transfer conduit 106 can be flushed out on either side of valve 108 prior to regeneration to flush the resins remaining therein into vessels 10 and 12.

In a further variation of this latter modification, the transfer flow can be continued, after the second volume has been segregated, to transfer the anion material to a separate regeneration vessel (see FIG. 4). In that instance, if desired the conduit 106 need not be flushed out, the minor amount of cation material remaining in the conduit 106 staying there until the next regeneration cycle when the next first volume will cause it to pass to the cation regeneration vessel.

In a further modification, when the intermediate layer comprises substantially pure inert material, the second volume is passed in equal proportions into the regenerator vessels prior to regeneration.

In a further modification, if the transfer water is variable in conductivity, the apparent conductivity of the contents of the conduit 106 can be detected at two separated points and compared so that a response is obtained only as a result of a difference in conductivity being detected and not by relying on, for example, the conductivity falling below a set value.

Generally, it has also been found that the anion resin can be contaminated by cation resin fines. Fines are present in the as-delivered resins (owing to limitations of commercial sieving procedures) and they are also created during service.

To remove the fines present in the as-delivered cation resin, the resin is put into vessel 10 and carefully backwashed. This causes the small proportion of fines and other unwanted resin beads, e.g. low density beads, to rise to the top of the cation resin bed. The cation resin bed is then transferred to the vessel 12, the transfer being terminated when it is estimated that the remaining resin consists predominantly of the fines and the unwanted resin beads.

To remove the cation fines created during service, the resins are separated into their respective vessels 10 and 12 as described above with reference to FIG. 1. Then saturated salt solution is circulated through the vessel containing the anion material to classify the resins, the anion and inert resins floating in the solution above the cation resin.

Once the resins have been classified, the cation fines are discharged through a drain connection (not shown) in conduit 106 by opening valves 36 and 94. After this, the anion resin is rinsed free of salt and regenerated in the manner described above.

Cation resin fines can be removed at, typically 6 to 9 month intervals. This way of removing the cation resin fines also has the advantage of the saturated salt solution cleaning accumulated organic matter from the anion resin.

Any fines arising from the anion resin are not a problem, since these pass out to drain during backwash via a strainer on the outlet conduit 50 which is not intended to retain fines.

Figure 5:
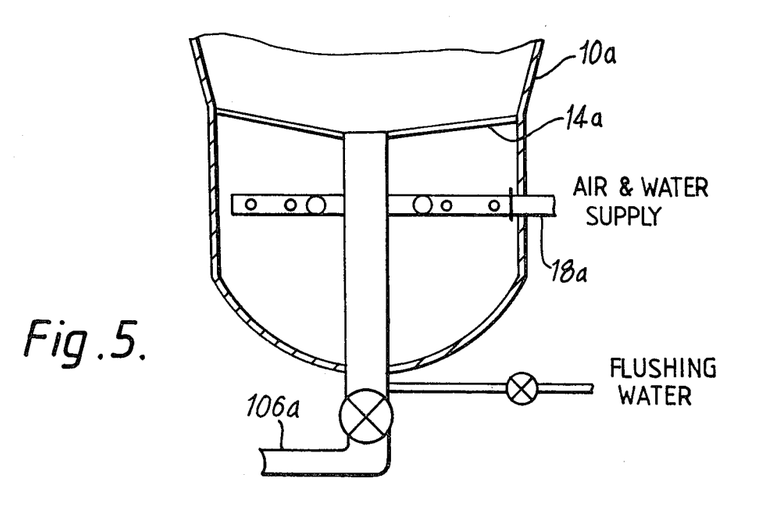
FIG. 5 is a partial cross-section of a modified apparatus.

In a modification of the embodiments (see FIG. 5), inlets of the transfer conduit(s) from the vessels, may be substantially co-planar with the perforate baffle, the transfer conduit(s) extending downwardly out of the vessel(s). In FIG. 5, a vessel 10a has a perforate barrier 14a, for example a wedge-wire screen, from which a transfer conduit 106a extends downwardly, the inlet to the conduit being sutstantially co-planar with the perforate barrier. As shown, the perforate barrier is preferably frusto-conical in shape, the included cone angle being preferably in the range 150° to 160°. In this modification, it is necessary to ensure that any materials in the vicinity of the inlet would be properly contacted by classification water, regenerant and rinse water, e.g. by supplying flushing water to flush resin from the inlet back into the vessel as indicated in FIG. 4. The air/water supply pipe 18a is connected to a distributor 18b which is looped around the conduit 106a and which has lateral pipes.

In another modification of the embodiments, the conductivity cell can be replaced by an instrument capable of differentiating between the resins by using light transmission or reflection. In another modification, the transfer conduit(s) could have a transparent section so than an operator can view that section and upon visually detecting the material of the second volume manually terminate the transfer.

Instead of a conductivity instrument an instrument responsive to the relative apparent pH value of the resin/water mixture may be used. Such an instrument may be of the kind shown as a pH cell or glass electrode type; but recently instruments have become commercially available which depend upon the use of dissimilar metals in a probe and which give rise to electro-motive force without the need for an external electric supply. Such a probe may be arranged to protrude into the resin/water mixture in the conduit.

The detector means can be located in the lower region of the separator vessel (as indicated at D in FIG. 4) if desired. In this modification; assuming the cation-inert interface is detected, the timer would be used to delay closing valve 108 for a greater period than when the detector is in the conduit. As the greater delay may lead to inaccuracies owing, for example, to fluctuating water pressure, it is preferred to position the detector means in the conduit.

As described above, the use of inert material is advantageous and it is preferred but its use is not mandatory. In some cases the use of inert material or of an optimum amount of inert material may be precluded for example because of limitations imposed by pre-existing equipment, such as where the invention is applied by way of modification of existing plant which, as originally installed, did not incorporate the invention. Furthermore, the amount of inert material, although initially sufficient to ensure adequate separation of the cation and anion materials on classification, may diminish during service and may not be replenished or may be inadequately replenished.

Therefore, in some cases the invention will be practised where the intermediate layer is devoid of inert material; or contains insufficient inert material to ensure optimum separation of the cation and anion materials on classification.

In those instances, detection of the interface is still readily achieved using a conductivity-responsive instrument or other detector even though, as explained above, the interface is then generally co-extensive with the intermediate layer.

Classification of the ion exchange materials in such cases into distinctly separate layers with a sharply defined interface as taught by the prior art discussed previously is not necessary since the invention, as explained with reference to the examples described above eliminates, or at least reduces to a point where they are negligible, the effects of the cross-contamination of the ion exchange materials.

What I claim is:

1. A method for separating a resin bed of a mixture of anion and cation exchange resins comprising the steps of:
   (a) classifying the mixture of the cation and anion resins using a classifying fluid in the presence of a solid, inert material which (1) imparts measurably different conductivity properties to the classifying fluid than the cation and anion exchange resin and (2) has fluidization characteristics such that, upon classification, it forms an intermediate layer positioned between the layer of anion resin and layer of cation resin and
   (b) measuring a conductivity property of the resin bed wherein the conductivity property varies with the degree of separation of the anion and cation resins and the position of the solid, inert material.

2. The method of claim 1 wherein the fluidic classification is conducted in a separation column and said method further comprises the step of removing the cation resin from the column containing the classified resin bed wherein the conductivity property of the resin bed being measured is a conductivity property of the effluent stream containing the cation resin, said conductivity property indicating the interface of the cation resin and the solid, inert material.

3. The method of claim 2 further comprising the step of ceasing the flow of the effluent stream, based on the measured conductivity property, to retain the anion exchange resin in the resin bed.

4. The method of claim 3 wherein the cation exchange resin is transferred to a first regeneration column.

5. The method of claim 4 wherein the anion resin is regenerated in the separation column.

6. The method of claim 4 wherein following transfer of the cation resin, the anion resin is transferred to a second regeneration column.

7. The method of claim 1 wherein the solid, inert material is in the form of spheroidal copolymer beads.

8. The method of claim 1 wherein the fluidic classification and conductivity measurements are conducted continuously.

* * * * *